Oct. 15, 1935.  J. W. LOGAN, JR  2,017,665
ELECTRIC BRAKE APPARATUS
Filed Nov. 11, 1933
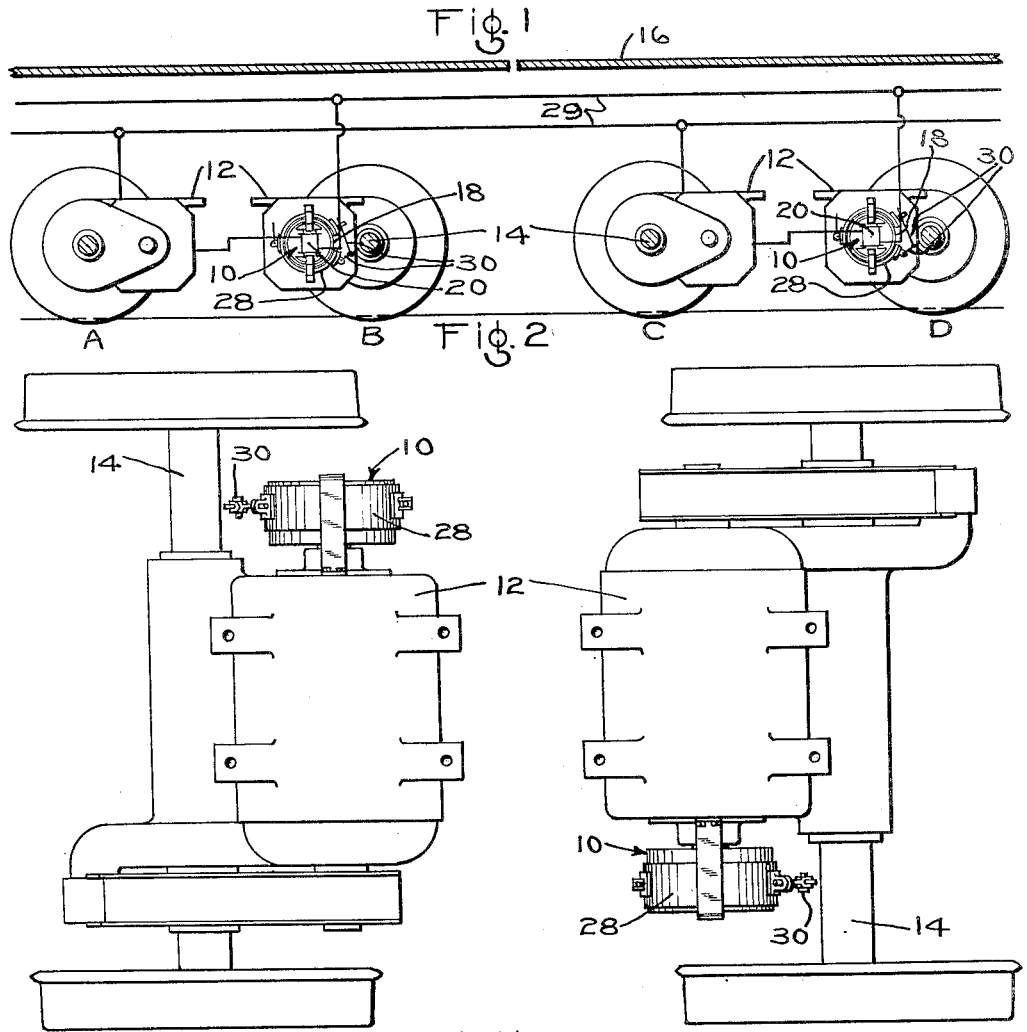
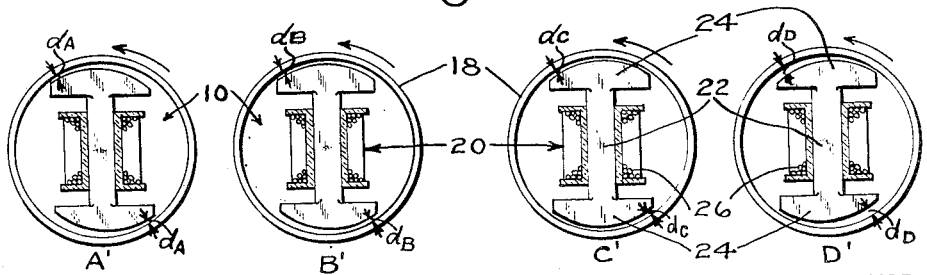
INVENTOR
JOHN W. LOGAN, JR.
BY  Wm. M. Cady
ATTORNEY Patented Oct. 15, 1935

2,017,665

UNITED STATES PATENT OFFICE 2,017,665

ELECTRIC BRAKE APPARATUS

John W. Logan, Jr., Wilkinsburg, Pa., assignor to The Westinghouse Air Brake Company, Wilmerding, Pa., a corporation of Pennsylvania Application November 11, 1933, Serial No. 697,641

15 Claims. (Cl. 188—2)

This invention relates to electro-dynamic brake apparatus, and more particularly to electro-dynamic brake apparatus of the eddy current type adapted to produce different braking effects on different axles of a vehicle.

When a vehicle is decelerating the force of inertia exerted upon it causes the vehicle to tilt forward, the degree of tilting depending upon the degree of deceleration. Because of this tilting action a greater load is imposed on the front axles of the vehicle during deceleration than upon the rear axles. As a consequence, the front wheels of the vehicle bear upon a track or roadway with greater force than do the rear wheels, and a greater braking effort may therefore be exerted upon the front wheels than upon the rear wheels without causing skidding. Since the brakes commonly employed on both rear and front wheels are the same, and since they are most generally applied with the same degree of braking force, it is obvious that with such an arrangement the maximum braking action cannot be obtained on both front and rear wheels, as the maximum degree of braking force must be limited to that which will not cause the rear wheels to skid.

An object of my invention is to provide an electro-dynamic brake apparatus of the eddy current type in which the braking effect produced on each axle of a vehicle is such as to correspond very nearly with the load on each axle during deceleration of the vehicle.

Another object is to provide a new type eddy current brake in which the desired braking characteristics are inherent within the brake and with which auxiliary or outside apparatus is not required, other than that normally used with an ordinary eddy current brake.

Still another object is to provide an arrangement of eddy current brakes of the character referred to in which the braking effect on each axle of a vehicle corresponds very nearly with the load on each axle during deceleration of the vehicle in either direction.

Other objects will appear from the following description, illustrated in the attached drawing, in which, Fig. 1 is a schematic arrangement of one embodiment of my invention as applied to a railway vehicle.

Fig. 2 is an enlarged plan view showing an adaptation of eddy current brakes to the motor driven vehicle axles shown in Fig. 1.

Fig. 3 is a schematic representation of four of my improved eddy current brakes associated with the four axles shown in Fig. 1.

Referring now to the drawing, the embodiment there illustrated comprises a plurality of eddy current brakes 10 associated with vehicle motors 12 drivingly connected to axles 14 adapted to support a vehicle, the floor of which is diagrammatically indicated at 16.

Each eddy current brake 10 comprises a cuplike rotor or brake drum 18 within which is mounted a stator 20. The stator 20 comprises a magnetic core member 22 having pole pieces 24 projecting toward and preferably coextensive with the axial length of the rotor 18. Each core member is provided with an insulated winding 26, which may have current supplied thereto in any suitable manner, such for example as by conductors 29 shown in Fig. 1, wherein the windings 26 of each pair of brakes are shown as connected in series, although other methods of connecting may be used.

The pole pieces 24 of each brake are provided with faces adjacent the rotor 18 which relatively diverge from the inner adjacent surface of the rotor, so that tapered air gaps are formed between the pole pieces and the rotor, for a purpose which will hereinafter more fully appear.

The rotor 18 of each brake is rigidly secured to the shaft of its associated motor 12, so that the rotor rotates at all times that the vehicle is in motion. A friction brake band 28, circumscribing the outer periphery of the rotor 18, is provided to produce a friction brake effect on the rotor 18 to supplement the braking effect of the eddy current brake when desired, as for example at low speeds where the eddy current brake is relatively less effective. The brake band 28 may be actuated through levers 30 by any of the commonly employed means.

An eddy current brake 10 is preferably associated with each axle 14 of a vehicle, and each brake preferably has air gaps between its stator and rotor tapered in the manner described but to a degree and in a direction such that the braking effect produced by each brake on its associated axle corresponds closely with the relative load on that axle during deceleration of the vehicle. For example, considering the arrangement illustrated in Fig. 1, if the vehicle axles 14 there shown be designated from left to right by the letters A, B, C and D, respectively, then the arrangement of air gaps in the brakes associated with these axles may be as indicated by the corresponding letters A', B', C' and D' in Fig. 3, where it is assumed that the rotors 18 rotate in a counter-clockwise direction, as shown by the arrows, when the vehicle moves to the left.

With reference to the arrangement shown in Fig. 3, it is to be understood that the air gaps in brakes A' and D' have the same degree of taper, but taper in opposite directions. The air gaps in brakes B' and C' also taper oppositely to each other and have the same degree of taper, but the degree of taper is less than that of the gaps in brakes A' and D'. This difference in degree of taper is to be understood to be such that if the distances across the gaps of the several brakes at the corresponding points indicated by the symbols $d_A$, $d_B$, $d_C$, and $d_D$, corresponding to brakes A', B', C', and D', respectively, be compared, then $d_A$ is less than $d_B$, $d_B$ is less than $d_C$, and $d_C$ is less than $d_D$, i. e. the gaps increase at this point progressively from the left (one end of the vehicle) to the right (other end of the vehicle). If the distance between the other tip of each pole piece 24 and the associated rotor 18 be considered in a like manner the converse is true, i. e. the distance diminishes from left to right. The object and importance of this arrangement will appear subsequently.

In operation, when it is desired to brake a vehicle equipped with my improved eddy current brake apparatus, current is supplied to the windings 26 through the conductors 29 in a degree in accordance with the degree of braking desired. Each winding 26 therefore receives the same degree of energization. A magnetic flux will be produced in each brake having a path including the core member 22, the pole pieces 24, the rotor 18, and the air gaps between the pole pieces and the rotor, of that brake. This flux will produce eddy currents in the rotor 18, which currents will in turn produce a counter flux partially opposing and partially adding to that produced by the stator in a manner such that the flux in the air gaps will be shifted in the direction of rotation of the rotor. If the direction of rotation be considered as counter-clockwise, as indicated in Fig. 3, then the flux will be largely concentrated at the top left tip and the bottom right tip of the pole pieces 24. The eddy currents in the rotor of each brake will therefore react with this concentrated or resultant flux to produce a retarding effect on the vehicle.

As the vehicle begins to decelerate from motion to the left, the force of inertia will cause it to tilt, so that axle A carries more load than axle B, axle B carries more load than axle C, and axle C carries more load than axle D. The air gaps in the brakes associated with each of these axles are proportioned such that the braking effect on each axle is different, so as to correspond very nearly with the load on that axle for most rates of deceleration, and exactly with the load on each axle for one specific rate of deceleration, which is usually taken as that corresponding to the maximum rate of deceleration, i. e. brake A' produces a greater braking effect on axle A than brake B' does on axle B, brake B' produces a greater braking effect on axle B than brake C' does on axle C, and so on. This is so because, as explained, at the point where the flux concentrates the air gaps increase in size progressively from axle A toward axle D, and these progressive increases reduce, progressively, the total resultant flux in each brake available to produce a braking effect, resulting in the differences in braking effects already referred to. With such an arrangement, therefore, the brake on each axle may be operated to produce its maximum braking effect, with the result that the vehicle can be brought to a stop more quickly than with the ordinary type of brake as now used.

If the direction of travel of the vehicle, and hence the direction of rotation of the rotors 18, be opposite to that assumed in the foregoing description, like results to those just described will be obtained, as the direction and degree of taper of the air gaps for this direction of rotation are such as to act in a like manner to that for the other direction of rotation. The flux produced by the winding 26 is now shifted toward the top right and lower left pole tips of pole pieces 24, i. e. in the direction of rotation of the rotors 18. The distance across the air gaps of the several brakes at these points increases progressively from right to left, i. e. just oppositely to that before described, but the air gap distances for the relative positions of the brakes for the two directions of travel correspond, i. e. the flux is concentrated across a gap in brake D corresponding to the gap in brake A for the opposite direction of travel, and so on for the other brakes. It will therefore be obvious that it is not necessary to make any changes in the brake apparatus when reversing the direction of travel of the vehicle, as the desired characteristics for both directions of travel are inherent within the brake apparatus.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake apparatus, the combination with a plurality of axles adapted to support a vehicle producing different loads on said axles when the speed of said vehicle is varying, of electro-dynamic brakes associated with said axles and inherently operable to produce a braking effect on each axle corresponding closely with the load of each axle.

2. In a vehicle brake apparatus, the combination with a plurality of axles adapted to support a vehicle producing different loads on said axles when the speed of said vehicle is varying, of electro-dynamic brakes associated with said axles, each of said brakes having a rotor and a stator defining a non-uniform air gap therebetween acting to cause said brakes to produce a braking effect on each axle corresponding closely with the load on each axle while said brakes are in action.

3. In a vehicle brake apparatus, the combination with a front axle and a rear axle upon which different loads are imposed when a vehicle supported by said axles is decelerating, of electro-dynamic brakes associated with said axles, each of said brakes having a rotor and a stator defining an air gap therebetween, the gap in one of said brakes being shaped to produce an effect different from the gap in the other of said brakes, whereby the braking effect on said axles is different.

4. In a vehicle brake apparatus, the combination with a front axle and a rear axle upon which different loads are imposed when a vehicle supported by said axles is decelerating, of electro-dynamic brakes associated with said axles, each of said brakes having a rotor and a stator defining a tapered air gap therebetween, the gap of the brake associated with one axle tapering oppositely to the gap of the brake associated with the other axle.

5. In a vehicle brake, the combination with a front axle, a rear axle, and intermediate axles, of electro-dynamic brakes associated with said axles, each of said brakes having a rotor and a stator defining a tapered air gap therebetween, the air gaps of the brakes associated with the intermediate axles being different from the air gaps of the brakes associated with the other of said axles.

6. In a vehicle brake, the combination with a front axle, a rear axle, and intermediate axles, of electro-dynamic brakes associated with said axles, each of said brakes having a rotor and a stator defining a tapered air gap therebetween, the air gaps of the brakes associated with the intermediate axles being of less taper than that of the air gaps of the brakes associated with the other of said axles.

7. In a vehicle brake apparatus, the combination with a pair of axles, of an eddy current brake associated with each of said axles, each of said brakes having a rotor and a stator with a tapered air gap therebetween, the air gap in one brake being of less taper than the air gap in the other brake.

8. In a vehicle brake apparatus, the combination with a pair of axles, of an eddy current brake associated with each of said axles, each of said brakes having a rotor and a stator with a tapered air gap therebetween, the air gap in one brake tapering in a direction opposite to that of the air gap in the other brake and each of said tapers being of a different degree.

9. In a vehicle brake apparatus, the combination of a pair of eddy current brakes adapted to brake a vehicle, each of said brakes having a rotor and a stator with an air gap therebetween, the stator being adapted to produce a magnetic flux across said gap to produce a braking effect, and means whereby the flux across said gap for equal energization of said brakes is relatively greater in one of said brakes for one direction of rotation and relatively less for an opposite direction of rotation.

10. A vehicle braking apparatus comprising a plurality of eddy current brakes disposed in spaced relation longitudinally of a vehicle, each of said brakes having a rotor and a stator defining a tapered air gap therebetween, the taper of said gap progressively changing in said brakes along said vehicle.

11. In a vehicle brake apparatus, the combination of a plurality of eddy current brake devices adapted to brake a vehicle, each of said brake devices having a rotor and a stator defining a tapered air gap therebetween, the stator being adapted to produce a magnetic flux across said gap to produce a braking effect on said rotor, the air gap in each of said brake devices being different from the air gap in the other of said brake devices and being effective in causing said brake device to produce a greater braking effect on its rotor when rotating in one direction than when rotating in an opposite direction.

12. In a vehicle brake apparatus, the combination with a plurality of vehicle axles upon which different loads are imposed when a vehicle supported by said axles is decelerating, of a plurality of electrodynamic brake devices associated with said axles, each of said brake devices having a rotor and a stator defining a tapered air gap therebetween, the air gaps in the brake devices associated with the axles adjacent the front end of the vehicle tapering in an opposite direction to the air gaps of the brake devices associated with the axles adjacent the rear end of the vehicle.

13. In a vehicle brake apparatus, the combination of a plurality of eddy current brake devices adapted to brake a vehicle, each of said brake devices having a rotor and a stator defining a tapered air gap therebetween, the stator being adapted to produce a magnetic flux across said gap to produce a braking effect on said rotor, the gap in each of said brake devices being different from that in the other brake devices either as to direction of taper or as to degree of taper.

14. A vehicle braking apparatus comprising a plurality of eddy current brake devices adapted to be disposed in spaced relation longitudinally of a vehicle, each of said brake devices having a rotor and a stator defining a tapered air gap therebetween, the taper of said gaps progressively changing in said brake devices along said vehicle from a taper in one direction to a taper in an opposite direction.

15. In a vehicle brake system, the combination with a plurality of vehicle axles, and a plurality of driving motors associated with said axles, each of said motors having a shaft, of a plurality of eddy current brake devices operatively connected to said shaft, each of said brake devices having a rotor and stator defining a tapered air gap therebetween, the taper of each gap in each brake device being different, whereby for equal energization of all of the brake devices a different braking effect is produced on each axle.

JOHN W. LOGAN, Jr.